(12) United States Patent
Corsi

(10) Patent No.: US 11,605,941 B2
(45) Date of Patent: Mar. 14, 2023

(54) METHOD AND SYSTEM FOR MONITORING AND REGULATING INDUCED GROUND LINE POWER

(71) Applicant: Michael Corsi, Kingston, RI (US)

(72) Inventor: Michael Corsi, Kingston, RI (US)

(*) Notice: Subject to any disclaimer, the term of this patent is extended or adjusted under 35 U.S.C. 154(b) by 0 days.

(21) Appl. No.: 17/461,144

(22) Filed: Aug. 30, 2021

(65) Prior Publication Data

US 2022/0069561 A1 Mar. 3, 2022

Related U.S. Application Data

(60) Provisional application No. 63/071,766, filed on Aug. 28, 2020.

(51) Int. Cl.
*H02H 3/00* (2006.01)
*H02H 3/08* (2006.01)
*H02H 1/00* (2006.01)

(52) U.S. Cl.
CPC ............ *H02H 3/08* (2013.01); *H02H 1/0007* (2013.01)

(58) Field of Classification Search
None
See application file for complete search history.

(56) References Cited

U.S. PATENT DOCUMENTS

| | | | | |
|---|---|---|---|---|
| 3,959,924 A | * | 6/1976 | Allen, Jr. ............ | A01M 7/0089 172/6 |
| 4,451,866 A | * | 5/1984 | Cinquin ................... | H02H 3/14 361/104 |
| 4,635,046 A | * | 1/1987 | Graham ............... | B65H 63/062 340/650 |
| 8,819,988 B2 | * | 9/2014 | Corsi ...................... | A01G 7/04 47/1.3 |
| 2018/0289244 A1 | * | 10/2018 | Masukawa ............. | A61B 1/018 |

* cited by examiner

*Primary Examiner* — Stephen W Jackson
(74) *Attorney, Agent, or Firm* — Barlow Joseph and Holmes Ltd; David R. Josephs

(57) ABSTRACT

A method and system is provided which monitors and regulates induced ground-line power on a structure or organism. Further a method and system is disclosed which monitors and regulates induced ground-line power by regulating and harnessing small current flows generated by induced EMF exposure on the structure or organism as they flow through the attached system to an Earth ground connection point.

12 Claims, 3 Drawing Sheets

METHOD AND SYSTEM FOR MONITORING AND REGULATING INDUCED GROUND LINE POWER

CROSS-REFERENCE TO RELATED APPLICATIONS

This application is related to and claims priority from earlier filed US Provisional Patent Application No. 63/071,766, filed Aug. 28, 2020, the contents of which are incorporated herein by reference.

BACKGROUND OF THE INVENTION

The present disclosure relates generally to a method and system for protecting bio-organisms from exposure to stray electrical impulses. More specifically, the present disclosure relates to a method and system that monitors and regulates the presence of stray induced current flows along grounding lines that may occur as a result of stray current and/or static electromagnetic radiation impacting a grounded organism or structure.

With the development of AC power distribution, everyone and everything on Earth has the potential of being exposed to coherent AC electromagnetic radiation. This form of EMF has a real and powerful ability to superimpose potentials on various bodies, structures and organisms. Static potentials induced by stray EMF can have a disruptive effect on the health, safety, integrity, stability, and operation of the system at large. It is known that one method for reducing this potential is by electrically grounding the object. By providing a ground, the superimposed potentials, in the form of static electrical potential, is given a path by which to flow from the object and back into the Earth ground. Such flows generate currents as subtle as the nanoamp spectrum. While these current flows are relatively small there are some applications, specifically in the areas of horticulture and energy-harvesting, that require harnessing, monitoring and regulating of these current flows.

It is known that, in the context of biological structures, such current flows can have a profound and lasting impact on the health and composition of exposed biological organisms. The need for an understanding of this electrical phenomenon, more specifically how it interacts with biological entities, is only just entering the forefront of modern science. It is known that with a growing number of power sources, there exists increased EMF exposure and more intense electrical stimuli, which if left connected to an unregulated ground, can have a lasting negative impact on the overall wellness of the connected organism.

In the context of energy-harvesting, there are specific requirements for grounding and ground-reference potential. Once the resonant structure allocated to 'harvest' EMF has been grounded, an opportunity and challenge is created. The designers must determine to either (1) create a static resistance to minimize transient current loss, although this is a poor solution given the necessary and sensitive method of harvesting EMF or (2) utilize this new ground connection to solely distribute the harvested EMF into a single-source storage device. In either case, one cannot adequately harness, monitor, and regulate the harvested EMF being sought unless the technology itself plays an integral role in its operation.

Without a substantially sophisticated and sensitive device for harnessing, monitoring, and regulating these small current flows, by definition no system could possibly achieve optimal stasis. The influence these subtle energies have upon the connected system are dramatic, yet in many instances not fully understood. As efforts into manifesting green solutions for world sustainability continue, researchers, scientists and engineers require tools of greater capability than have yet been developed.

There is therefore a need for a new method and system to monitor and regulate induced ground-line power which offers both a window and a channel into harnessing the power and possibility of that which is seldom understood yet most principal in application.

BRIEF SUMMARY OF THE INVENTION

In this regard, the present disclosure provides a method and system for monitoring and regulating coherent and incoherent induced ground-line power. An organism or structure is connected to ground via the system which in turn variably monitors and regulates the flow of induced current. The system further utilizes a power source suited for the requirements of the application. In one embodiment, the system is powered by an interconnected energy storage system that the system has been tasked to monitor and regulate, yielding a continuously operable device provided s sufficient induced current flow is available.

In another embodiment, a potted plant is brought into equipotential with the Earth through the ground found in the distribution source that powers the device. In either instance, the system is intended to monitor varying electrical stimuli, responding in such a way that the connected component(s) be maintained in ideal stasis. Both embodiments present concepts, phenomena and challenges to which the unique design criteria are tailored but employ the system of the present disclosure to monitor and regulate any coherent and incoherent ground-line power that has been induced.

In view of the foregoing, it is an object of the present disclosure to provide a method and system to monitor and regulate induced ground-line power. It is a further object of the present disclosure to provide a method and system to monitor and regulate induced ground-line power by regulating and harnessing small current flows generated by induced EMF exposure on the structure or organism as they flow through the attached system to an Earth ground connection point.

These together with other objects of the invention, along with various features of novelty which characterize the invention, are pointed out with particularity in the claims annexed hereto and forming a part of this disclosure. For a better understanding of the invention, its operating advantages and the specific objects attained by its uses, reference should be had to the accompanying drawings and descriptive matter in which there is illustrated a preferred embodiment of the invention.

BRIEF DESCRIPTION OF THE DRAWINGS

In the drawings which illustrate the best mode presently contemplated for carrying out the present invention.

DETAILED DESCRIPTION OF THE INVENTION

Figure 1:
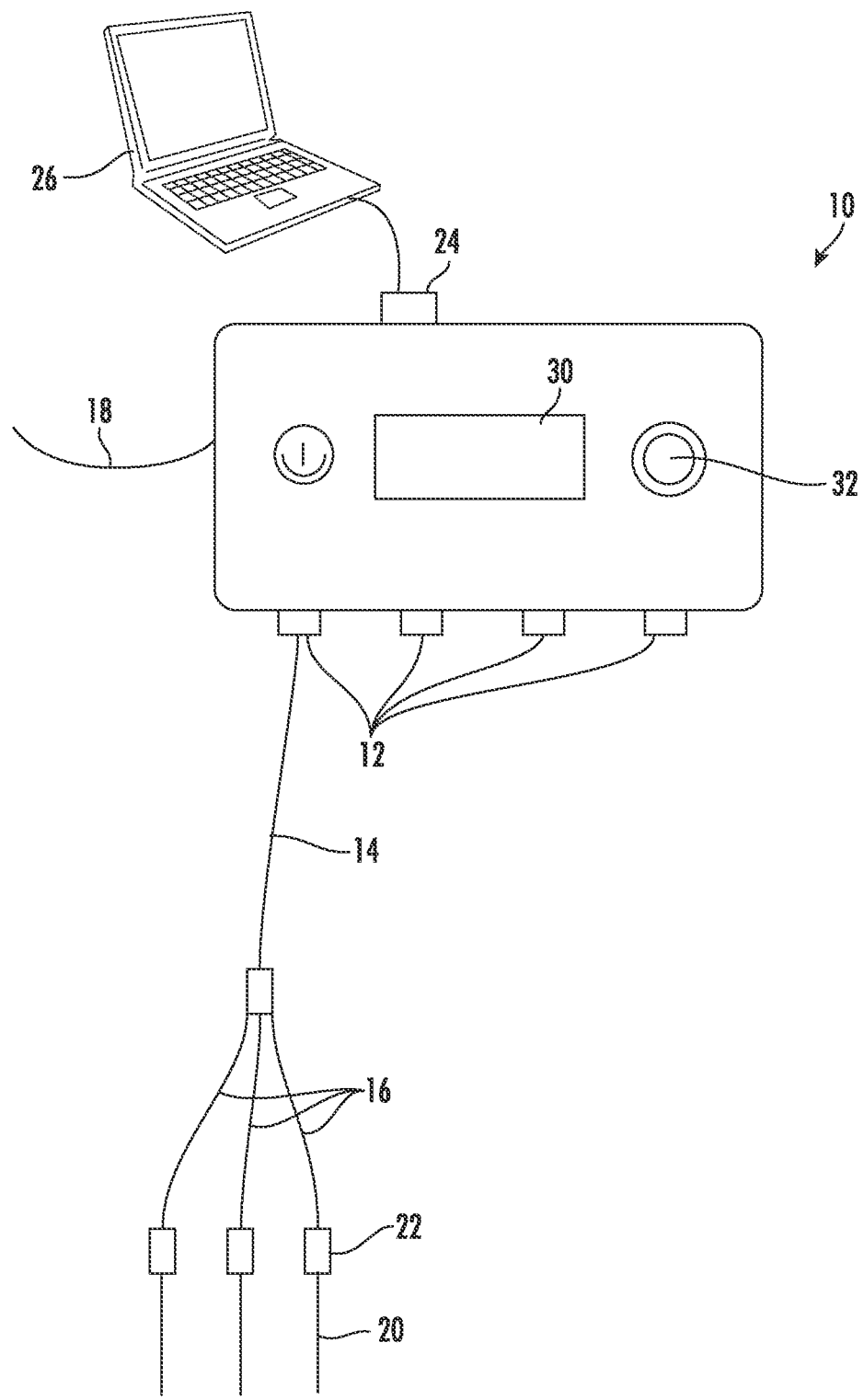
FIG. 1 is a schematic view of the system of the present disclosure.

Now referring to the drawings, a method and system is illustrated for monitoring and regulating coherent and incoherent induced ground-line power. An organism or structure is connected to ground via the system which in turn variably monitors and regulates the flow of induced current via the grounding connection. The system further utilizes a power source suited for the requirements of the application. In one embodiment, the system is powered by an interconnected energy storage system that the system has been tasked to monitor and regulate, yielding a continuously operable device provided s sufficient induced current flow is available.

In another embodiment, a potted plant is brought into equipotential with the Earth through the ground found in the distribution source that powers the device. In either instance, the system is intended to monitor varying electrical stimuli, responding in such a way that the connected component(s) be maintained in ideal stasis. Both embodiments present concepts, phenomena and challenges to which the unique design criteria are tailored but employ the system of the present disclosure to monitor and regulate any coherent and incoherent ground-line power that has been induced.

Turning now to FIG. 1, a controller 10 is shown for the intelligent operation of remaining system components. It should be noted that the remaining system components are customized and tailored to meet the unique needs of each embodiment and application as will be described in more detail below. In all embodiments of the disclosure there must be a way to interface with the controller through means of simple apparatuses and/or dynamic operator interface. As shown, the controller 10 includes a plurality of bus connections 12 that allow connection to bus lines 14. In turn each of the bus lines 14 allows connection of one or more grounding probes 16. Further the controller 10 includes a power connection 18 for integration with conventional grounded AC power distribution systems. The controller 10 also includes a communications port 24, that allows serial communication with the controller 10 via an external computer 26 using a standard USB cable connection. In other embodiments, the communications between the controller 10 and the computer 26 may be done by any wireless connectivity standards known in the art.

In the embodiment shown, the grounding probes 16 are shown as electrodes 20 extending from a connection wire 22 that facilitates interconnection with the bus lines 14. This arrangement facilitates insertion of the electrodes 20 into the soil of a potted plant for example. In other embodiments, the grounding probes 16 may interface directly with the bus connections on the controller 10. In further embodiments, the grounding probes may include a lug, or any other electrical connection method known to those skilled in the art to facilitate a reliable electrical connection with the structure to provide a reliable connection thereto. Since such connections are well known in the art they need not be further described herein.

Figure 2:
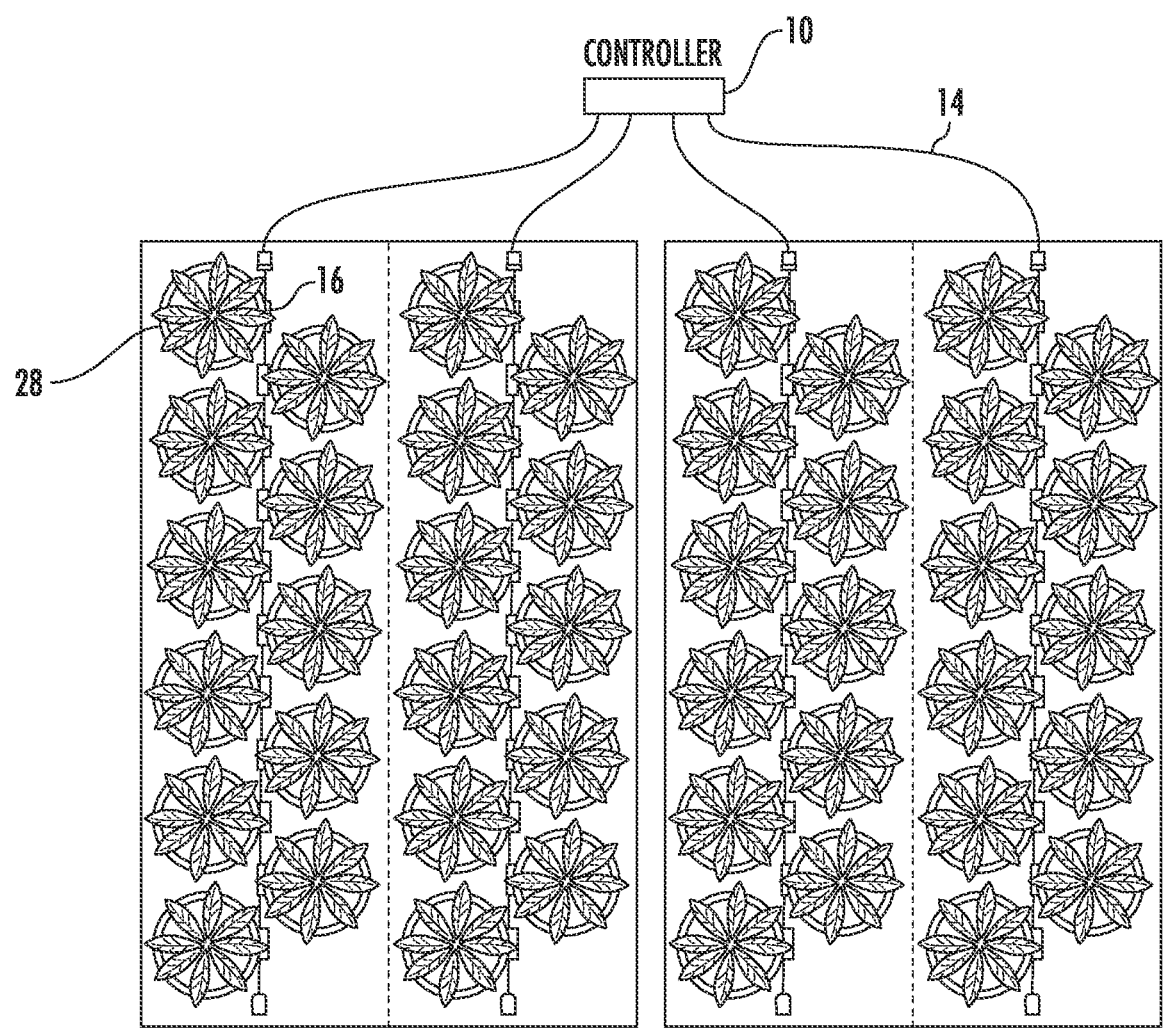
FIG. 2 is an environmental view of an embodiment of the system of the present disclosure.

As shown in the embodiment illustrated at FIG. 2, biological entities, such as container grown plants 28 and aspirational electronics alike require a method and system for harnessing and/or mitigating the static radiant waveforms imposed upon them by the background environment. Absent a controlled path to ground these plants 28 can experience a buildup of EMF potential that cannot be dissipated. The coherent and incoherent EMF potential is translated through the plants 28. Upon establishment of the grounding connection via the probes 16 the built-up EMF potential becomes the equivalent of a guided wave propagating along and about the probe 16, the buss 14 and into the controller 10. The propagating EMF potential is then detected and utilized by the controller 10 according to a specific mode that includes not only the fundamental waves propagating, but additionally or alternatively, non-fundamental waves. Higher-order waves' modes include those symmetrical that have a substantially circular electric or magnetic field distribution and/or a symmetrical electric or magnetic field distribution; inclusive are asymmetrical modes and/or other waves that have non-circular and/or asymmetrical field distributions around the wire or other transmission medium. For example, an electromagnetic wave of interest for harvesting or utilization can propagate along a transmission medium (e.g., commonly 'open air') from the radiating source to the receiving device or along a form of coupling device via one or more guided wave modes such fundamental, hybrid and non-fundamental wave modes.

Operating Principle

Figure 3:
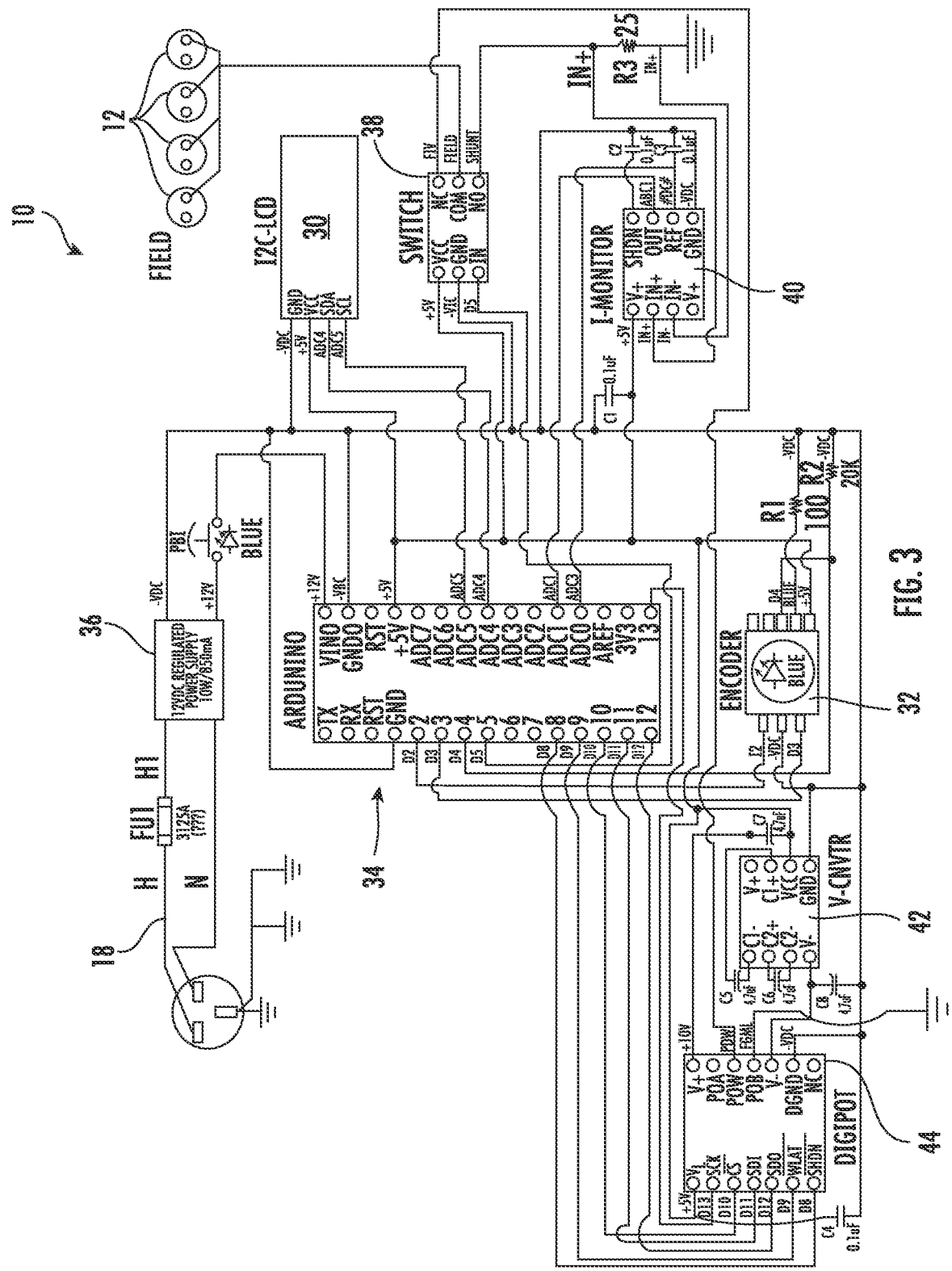
FIG. 3 is a schematic view of operational components of the system of the present disclosure.

As stated above, the controller 10 is utilized for intelligent operation of the remaining system components, which are customized and tailored to meet the unique needs of each embodiment and application. Returning to FIG. 1 in combination with FIG. 3, the controller 10, is controlled using simple apparatuses and/or dynamic operator interface. This user entry becomes the fundamental values around which the system tunes and operates for optimal statis. This embodiment illustrates shows a simple screen in the form of an LCD display 30 and pushbutton encoder 32 that provides a means of both entry and confirmation of system setpoints, status and operation.

In dissipating the EMF potential from the grounded structures, optimal statis is determined by comparing a detected stimuli in the form of EMP potential flowing on the grounding probes 16 and bus 14 to a predetermined and specific desired value. Under stimulation and overstimulation by imposed EMF potential both pose their own points of consideration. The controller 10 acts in accordance with set values to process the detected stimuli and determine whether the connected grounded structure is experiencing either under stimulation or overstimulation. In response to the detected EMF potential, the controller 10 has a user selectable response set that determines whether to contain, modulate and/or expel the detected stimuli. In detecting the stimuli, in order to provide a controlled response, the controller 10 via an onboard processor 34 may apply smoothing or averaging algorithms to thereby control calibrated responses by the regulator circuits as described further below.

To exemplify an iteration of the Induced Ground-Line Power Regulator, each connected component will be discussed on their own merit, as to do so will demonstrate their vital integration and position in said regulator device. Although much or many connected components are readily available as power circuitry or logic-gate devices, the integration and use thereof are unique for identified needs previously stated. Furthermore, the novel nature of this Induced Ground-Line Power Regulator necessitates that more new or novel devices may have to be developed and/or modified in order to meet the demands of specific cited applications. It is, of course, not possible to describe every conceivable advancement, development, component, methodologies, or combinations thereof adequate for the purpose of describing these examples, but one of ordinary skill in the art can recognize that many further combinations and permutations of the present embodiments are possible. For simplification, an embodiment illustrated by the control and regulation of induced ground-line power through potted plants is subsequently discuss.

A main source of power 18 including an ultra-low impedance-resistance path to earth ground are necessary within the present disclosure. Such a connection is achievable via a multitude of options. In this instance, a conventional power cord of sufficient gauge wire and suitable protective qualities may be chosen. Here, main power comes in the form of single-phase—85-264 VAC—50/60 Hz power distribution, fused protected and connected to a 12 VDC regulated power supply 36, sized sufficiently to drive all features and operations of the controller 10. The selected ultra-low impedance-resistance path is then bonded externally and directly to earth ground whilst connected to key operational points internal and contained within the 'device'. It is through this ultra-low impedance-resistance path that all induced ground-line power is dispersed as needed during the utilization, regulation or reduction of the imposed EMF potential.

The DC voltage power supply 36 is carefully selected, taking into account the intended application, components integrated, and desired performance characteristics required for optimal stasis. More specifically, the voltage range selected may dictate, even limit, components available for integration. Furthermore, the rail-to-rail voltage of sensitive yet vital analytic components, those that are required for full-range and most accurate approximation of induced ground-line power, are to be given priority consideration in limitative or optimizable ranges of said harvested power. In this embodiment, a 12 VDC switch-mode power supply is utilized for ideal form fit and function of connected components, such as intelligent controller and light indicating pushbutton switch.

The onboard processor 34 is illustrated as an Arduino micro-controller here. A wide variety of onboard processors 34 are available throughout the market, including customized solutions, thus the design is not limited to this component selection. Model selection is dictated by the total inputs and outputs, appropriate signal types, power sourcing capability, resolution, accuracy, and form factor. This onboard processor 34 acts as the central command for all connected components, whose operation is directed solely by an algorithm installed therein. The user-interface display 30, electromechanical relay 38, current monitor 40, voltage converter 42, digital potentiometer 44 and encoder 32 are interconnected and utilized by the onboard processor 34 for operation of the controller 10 system.

The user-interface display 30, and encoder pushbutton 32, are utilized to establish operating setpoints, receiving feedback data and alarm management. As a space-saving consideration, these devices may be consolidated into one electronic screen or mounted remotely and interfaced with the onboard processor 34 via wireless communication protocol such as, but not limited to, Bluetooth or WiFi. In some embodiments, such as power-limited EMF-harvesting applications, this may be the preferred means of interconnection and scalability; making one user-interface display a centralized and consolidated means of managing multiple controllers 10, the limitless applications of which exceed the scope of this discussion, numbering into the thousands.

In operation, the switch 38 is operable by the onboard processor 34, to switch a single input to isolated output(s). More specifically this switch 38, acting at the direction of the onboard processor 34, redirects a connection between the interconnected field of plants 28 and earth-ground via. This redirected connection is the result of the onboard processor 34 control signal operation of the digital potentiometer 44 and a shunt resistor on the current monitor 40. The electrostatically induced power harvested and streamed through the switch 38 contacts may be on an order so low that logic-gate and standard electromechanical devices are likely are not suitable. Incorrect specification on this device renders the entire regulator ineffective, thus operating parameters must carefully vetted, based upon the intended application. Ultra-low power, high-range resolution analog switching devices are best suited and the preferred choice for the most sensitive and challenging applications.

As the sole purpose of the present disclosure is to control an optimal stasis for the connected host, careful and accurate detection of the induced EMF potential if determined by the current monitor 40. By monitoring an appropriately sized shunt resistor and reference voltages, the controller 10 dynamically scales the potential differential exhibited by induced EMF potential flowing from the field of plants 28 to earth-ground. This scaled value is rectified and translated by the current monitor 40 into an analog signal, fed directly to the onboard processor 34 for analysis and action. The onboard processor 34 makes real-time as well as user-specified cyclic determinations on whether the current flow is within desired or anticipated ranges. This device may also be power cycled as a means of self-test or isolation. Once the condition of the impulse has be established, the onboard processor 34 uses the potentiometer 44 to maintain or modulate total power being transferred, performing a redundancy check once the action has been completed.

The physical regulating device contained within this controller 10 is the potentiometer 44, which may be of a digital or analog form factor. For reasons aforementioned and in the interests of exemplifying a single regulator application, a digital potentiometer is discussed herein. A voltage converter 42 establishes the rail-to-rail voltage, which is again application specific. Based on feedback received from the current monitor 40, the onboard processor 34 sends an instruction to the potentiometer 44 to modulate total impedance-resistance exhibited on the field-to-earth-ground connection. Crucially, this potentiometer must have range and capability to maintain optimal stasis indefinitely, if so required. Intelligent operation is another desired aspect of the potentiometer, which reduces the total ancillary circuitry required to modulate or establish timed operations. The user setpoints become the fundamental values around which the system tunes and operates for optimal stasis. This example shows a simple screen and pushbutton encoder that provides a means of both entry and confirmation of system setpoints, status and operation.

Switches 38 of suitable character are implemented for the purpose of determining and diverting power signals and waveforms to specific devices, each serving its own purpose in the operation of the system. These specific devices are principal in system functionality and must be selected as most appropriate. The example set forth here presents a current monitor 40, necessary for monitoring present electrical stimuli. Furthermore, a digital potentiometer 44 is utilized as a regulator, varying the degree to which current is induced. This application requires a voltage converter 42 to accommodate full scale operation of the digital potentiometer, thus appropriate behavior within the system. Together with the onboard processor 34, this method and system is capable of monitoring and regulating varying electrical currents within a high degree of accuracy.

Sequence of Operation

Analytical algorithms and command-based operation are conducted simultaneous and in concert with connected components via the onboard processor 34. The results as determined by the algorithm dictate that some or, in the case of optimal stasis within coded dead-band ranges, no action is taken. Sequencing and timing are both integral to the proprietary code established as well as user-configurable in order to fine-tune the dampening characteristics. A core example of sequential operation is as follows:

(1) Operator enters and confirms a desired setpoint.
(2) Conduct self-test on the current monitor, a validation that the device is working properly and within factory-specified accuracies.
(3) Controller samples the induced ground-line power via current monitor feedback signal.
(4) Feedback signal is sampled over time, a smoothing and averaging function that yields a 'conditioned' and 'accurate' value.
(5) Scaling functions are associated with detected and conditioned value.
(6) Comparative analysis is conducted against past data-logged and 'last' values.
(7) Projections are made for immediate and future aggregate electrostatically induced ground-line stimuli.
(8) A determination is made, whether modulation of the potentiometer is necessary in order to reach, or maintain, steady-state optimal stasis or in anticipation of dynamic changes based on prior events.
(9) Conduct self-test on the potentiometer, a validation that the command was successful and to register the present potentiometer setting.
(10) Repeat steps (2) through (9) at established time- or event-based intervals; a new operator entry mandates that the sequence operates, resetting the original time-based interval to zero, if applicable.

It can therefore be seen that the present disclosure provides a method and system to monitor and regulate induced ground-line power. The present disclosure further provides a method and system to monitor and regulate induced ground-line power by regulating and harnessing small current flows generated by induced EMF exposure on the structure or organism as they flow through the attached system to an Earth ground connection point. For these reasons, the instant invention is believed to represent a significant advancement in the art, which has substantial commercial merit.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A device for monitoring and regulating induced ground line current, comprising:
    a power supply;
    a ground connection in electrical contact with an earth ground;
    at least one probe in electrical communication with a structure or organism to be monitored and regulated;
    a means for sensing an EMF potential difference between said ground connection and said probe, comprising:
        a potentiometer;
        a voltage converter;
        a current monitor; and
    a processor that controls a shunting mechanism between isolating said probe,
    wherein said voltage converter determines a voltage difference between said ground connection and said probe and provides said voltage difference to said processor,
    wherein said current monitor detects a current flow between said ground connection and said probe and provides said current flow to said processor,
    wherein said processor instructs said potentiometer to modulate total impedance between said ground connection and said probe to maintain said predetermined EMF stasis level.

2. The device of claim 1, wherein said structure to be monitored and regulated is a container grown plant.

3. The device of claim 1, said at least one probe is a plurality of probes.

4. The device of claim 1, further comprising:
    a grounding bus with connection points thereon for a connecting a plurality of said probes to said device.

5. The device of claim 1, further comprising:
    a power cord to connect between said device and a conventional wall outlet, said power cord providing AC power to said device, a ground prong in said power cord providing said ground connection to said earth ground.

6. The device of claim 1, further comprising:
    a communication bus connected to said processor to allow connection thereto using a remote computer.

7. The device of claim 6, wherein said communication bus is wired.

8. The device of claim 6, wherein said communication bus is wireless.

9. The device of claim 1, wherein said processor determines based on input from said current monitor and said voltage convertor whether the connected grounded structure is experiencing either under stimulation or overstimulation and employs a predetermined response to said under stimulation or overstimulation to either reduce or increase a current flow between said ground connection and said probe to send instructions to said potentiometer.

10. The device of claim 1, further comprising:
    a user interface for providing set points to said processor, said processor using said set points to determine said predetermined EMF stasis level.

11. The device in claim 10, said user interface further comprising:
    an LCD display; and
    an encoder.

12. The device in claim 10, said user interface further comprising:
    a computer in wireless communication with said processor.

* * * * *